A. HERZ.
RELAY MECHANISM FOR FLOW METERS AND OTHER USES.
APPLICATION FILED DEC. 20, 1917.
1,331,065.
Patented Feb. 17, 1920.
5 SHEETS—SHEET 1.
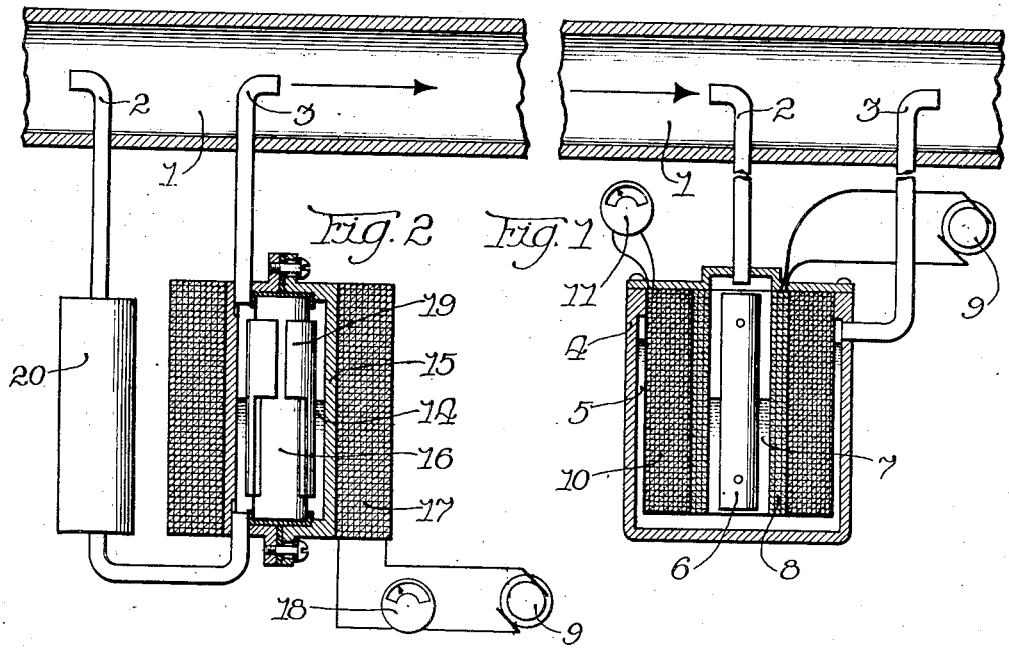
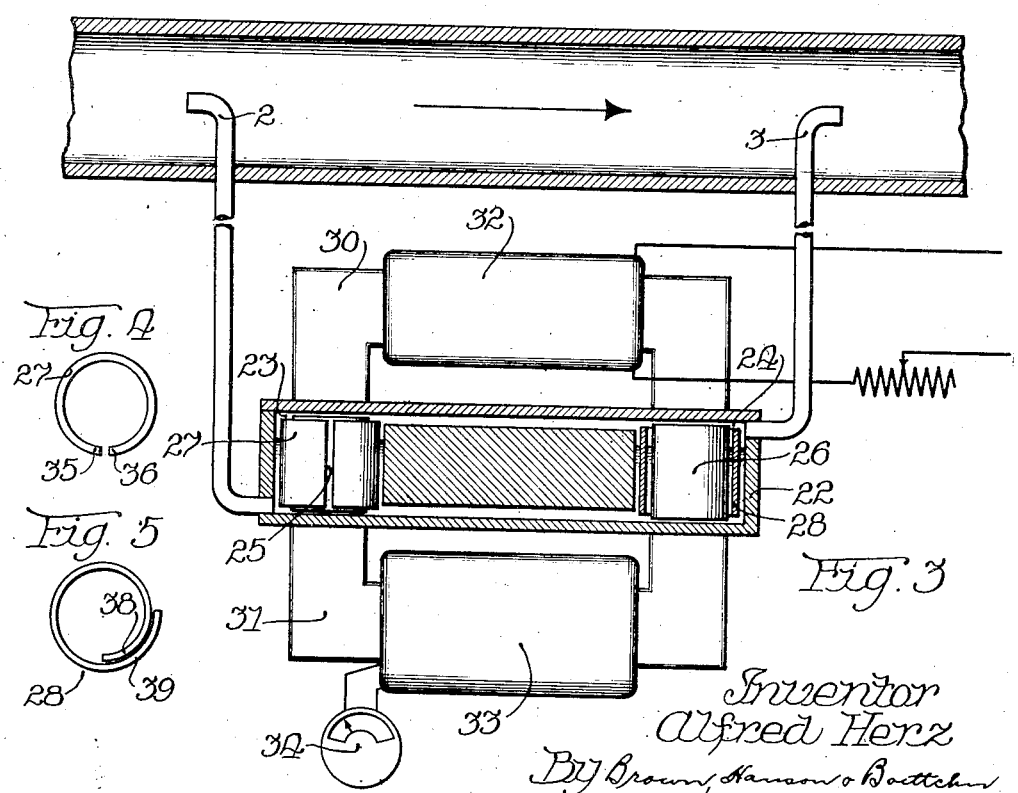
Inventor
Alfred Herz
By Brown, Hanson & Boettcher
Attorneys

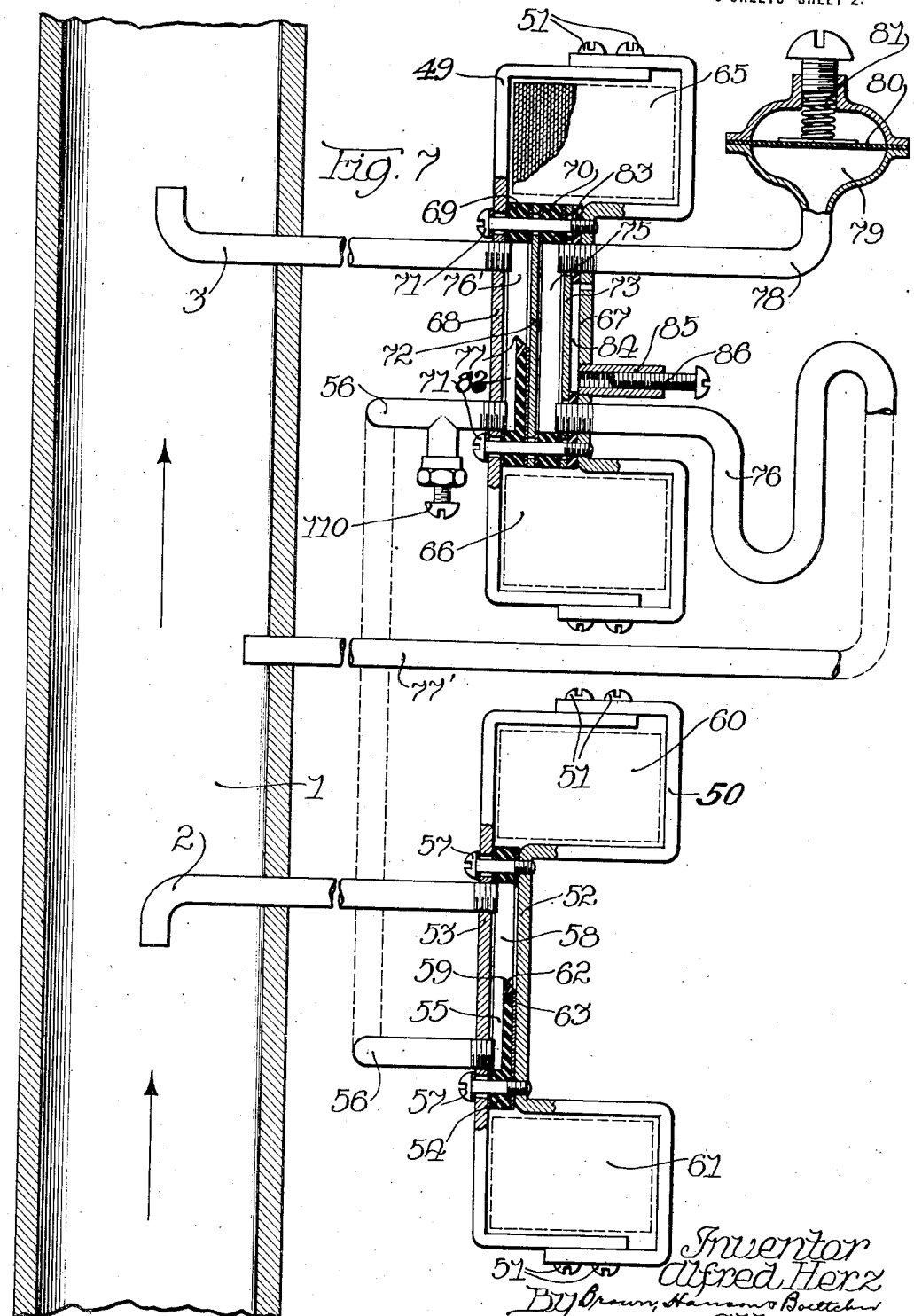

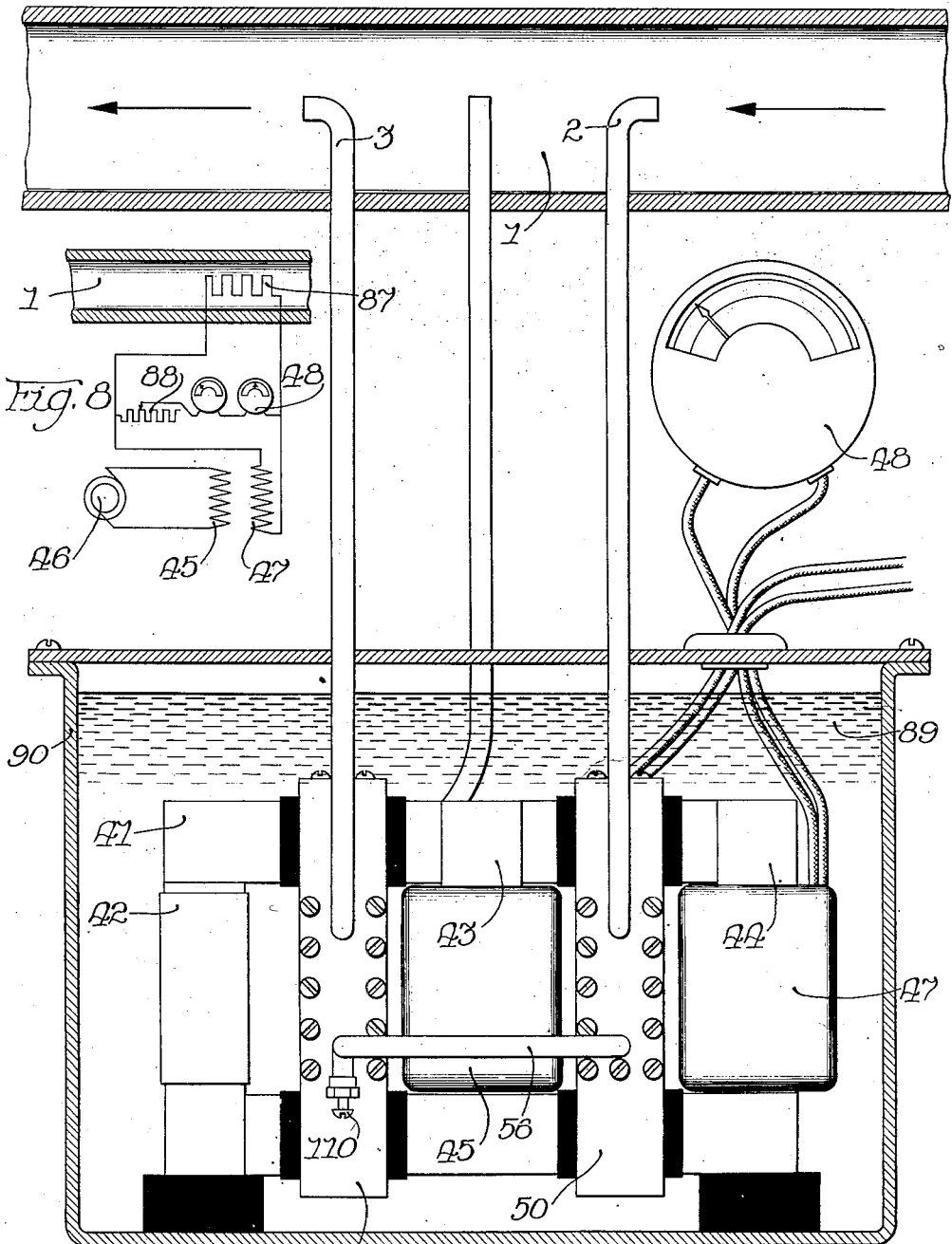

Inventor
Alfred Herz

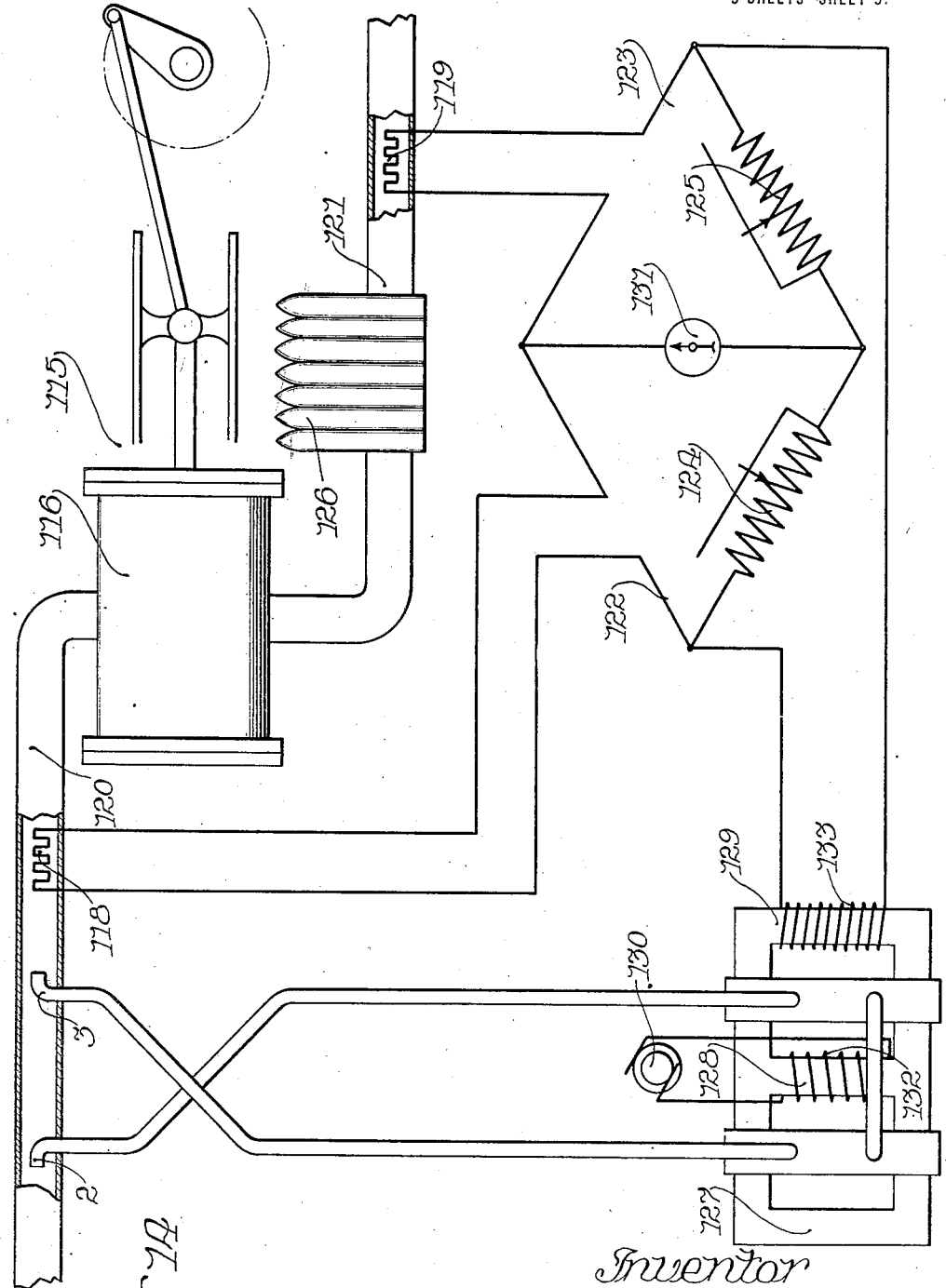

UNITED STATES PATENT OFFICE.

ALFRED HERZ, OF CHICAGO, ILLINOIS.

RELAY MECHANISM FOR FLOW-METERS AND OTHER USES.

1,331,065.  Specification of Letters Patent.  Patented Feb. 17, 1920.

Application filed December 20, 1917. Serial No. 208,015.

*To all whom it may concern:*

Be it known that I, ALFRED HERZ, a citizen of the United States, residing at Chicago, in the county of Cook and State of Illinois, have invented a certain new and useful Improvement in Relay Mechanism for Flow-Meters and other Uses, of which the following is a full, clear, concise, and exact description, reference being had to the accompanying drawings, forming a part of this specification.

My invention relates to relay mechanism for flow meters and other uses.

One of the difficult problems of engineering is the measuring of the flow of liquid in pipes, conduits and the like. Where pressure is low and the flow is relatively small and slow, and where a small drop of pressure is permissible, the piston type of meter may be employed and fair accuracy may be obtained.

But in the case of light fluids such as steam mains or the like, where the velocity of the fluid runs up to 8000 or 10,000 feet per minute, and the pressure is relatively great, the piston type of meter is not feasible. Meters of the orifice type have been employed but they are not satisfactory.

The Venturi tube was designed to perform the function of a metering orifice without the loss of head. The Venturi meter generally employs piezometer tubes for measuring the pressure at various points in the fluid throughout the Venturi tube; and from the differences existing at various points and knowing the sizes of the conduit at which the piezometer tubes are placed, a fairly good measure of the flow can be obtained. The difficulty with this general type of meters is to measure accurately the differences in pressure. Relatively great changes in flow correspond to small differences in pressure.

A further type of meter has been developed for measuring the flow of fluid where the pressure is great and the flow high. It comprises a pair of Pitot tubes which face in opposite directions in the line of flow of the fluid. The flow of fluid in the conduit will produce a pressure in the open mouth of the tube facing against the current which is proportional to the square of the velocity of the flow of fluid.

Where the pressure is measured in terms of the height in feet of a column of the fluid under consideration, the velocity may be computed in terms of feet per second, according to the well known formula:

$$V = \sqrt{2gh}$$

Where two Pitot tubes are employed, one facing against the flow of fluid in the pipe and the other facing in the direction of the flow of fluid in the pipe, and the two tubes operate upon a column of the fluid to produce a difference in level, the formula is modified to read:

$$V = 2\sqrt{gh}$$

$h$ being the difference in level, or the actual height of the column. In this type of meter, as well as in the Venturi meter, the difficulty is to measure and indicate accurately the difference in height of the fluid in the two legs of the column.

A mercury column is generally employed, and while it is fairly easy for an attendant to measure this difference in height, no entirely satisfactory means have so far been devised for automatically indicating upon a dial the flow in the pipes. It is desirable to keep a continuous chart of flow, so that an accurate record of the total flow over a given period may be obtained, as well as to have a record of the variations in the flow.

My invention aims to provide a sensitive relay controlled by small mechanical movement to give a relatively great effect. I am aware that numerous devices have been provided for indicating the height of a column of mercury in which a series of electrical contacts are arranged to be closed by the mercury as it rises. This gives a discontinuous reading and it is an aim of my invention to give a continuous reading.

The relay of my invention is particularly useful in flow meters, but I recognize its adaptability to general purposes and contemplate its application to other situations for translating differences in pressure, changes in position, height, voltage, temperature, etc., into a flow of current suitable for a direct reading indicator, or for other consequences or purposes.

A further object of the invention is to provide specific improvements in the apparatus for embodying the broad invention.

I provide two coils or conductors in inductive relation to each other and vary the inductive relation in accordance with the quantity or manifestation to be measured and indicated.

The one coil or conductor is charged with alternating current, or other regularly fluctuating current; and the secondary, or metering coil or conductor, is connected to the measuring and indicating meter.

I secure the change in inductive relation preferably by diverting the magnetic flux to a greater or less extent.

I do not intend to be limited to this aspect of the invention. It is apparent, in considering my invention from another standpoint, that the same provides an intermediate winding or conductor which is short-circuited to greater or less extent. I therefore contemplate short-circuiting one of the windings—preferably the secondary or metering winding—to a greater or less extent. While in the preferred embodiment, I do the equivalent in function by choking out the flux with a separate winding, I may choke out the flux by short-circuiting to a greater or less extent the secondary or metering winding itself.

In order to teach those skilled in the art how to construct and practice my invention, I shall now describe one embodiment of the same, pointing out the principles involved, the relation of the parts, and the conditions to be observed.

In the accompanying drawings:

Figure 1 is a diagrammatic cross section of an early form of my invention;

Fig. 2 is a similar view of a device embodying a further change of developments;

Fig. 3 is a similar view of a further developed form of the invention;

Figs. 4 and 5 are plan views of rings which will be described in detail later;

Fig. 6 is a diagrammatic cross sectional view of the preferred form of my invention;

Fig. 7 is a diagram showing the mercury columns and short-circuiting conductors in cross section; the parts of apparatus are not in practical arrangement, this figure being schematic only;

Fig. 8 is a diagram;

Fig. 14 is a diagram employing an embodiment of my invention for measuring power.

Figure 9:
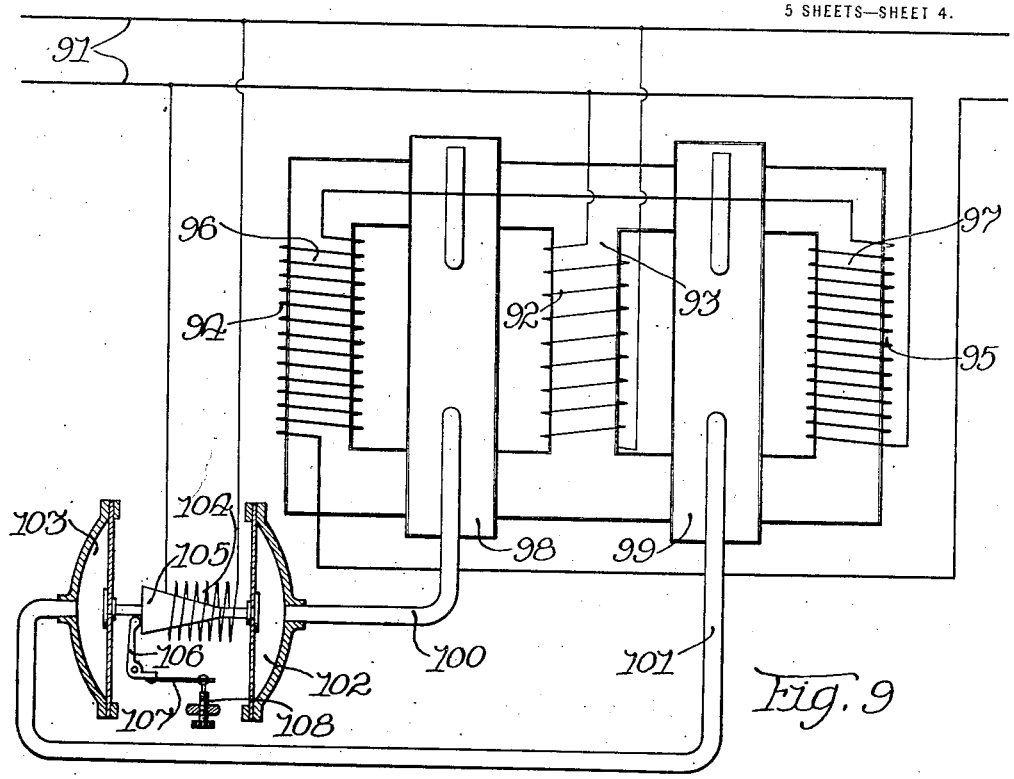
Fig. 9 is a diagram of a regulator embodying my invention.

In endeavoring to provide a measuring and indicating device for measuring and indicating the rise and fall of a column of mercury, I have been impressed with the necessity of continuity of reading, accuracy and faithfulness as well as adjustability and adaptability to circumstances.

In the form shown in Fig. 1, the pipe or conduit 1 which contains the flow of fluid to be measured, has the Pitot tubes 2 and 3 placed therein so that the open ends of the same face against and with the current of fluid, respectively, so that positive and negative pressures will be created in the mouths of these tubes in accordance with the formula above pointed out.

The tubes 2—3 are connected to the interior of a closed vessel 4, which vessel is adapted to contain a body of mercury 5, one leg of which is subject to the pressure in the mouth of the tube 2 and the other leg of which is subject to the pressure in the mouth of the tube 3. A central magnetic core 6 is surrounded by the column 7. A primary winding 8, about the core 6, is connected to a source of alternating current 9 and this primary winding is continuously energized.

About the primary winding 8, there is placed the secondary or metering winding 10 which is connected to the meter or indicator 11. These two windings with their core form in effect a small transformer, similar to the medical induction coil which is well known. The windings 8 and 10 are in inductive relation; and the rise and fall of the column of mercury 5—7 varies this inductive relation so that the meter 11 indicates in accordance with the rise and fall of pressure, the flow of fluid in the pipe or conduit 1. The mercury surrounding the core 6 operates as a short circuit winding to a greater or less extent, thereby varying the inductive effect of the primary upon the secondary winding.

One difficulty with this form of the apparatus is that the meter will not read zero when zero flow of fluid in the pipe or conduit 1 occurs. This is due to the fact that the inductive effect between the two windings is not entirely destroyed when the flow is zero since the inductive relation still exists even though the flux in the core 6 is destroyed.

In Fig. 2 I have indicated a further stage in the development of my invention. In this case the Pitot tubes 2—3 operate upon the body of mercury 14 to cause it to rise or fall within the copper shell 15. This copper shell is divided into two parts, insulated from each other but securely clamped together to form a container for the body of mercury 14. A magnetic core 16 is held in insulated relation within the copper casing 15 and a winding 17 surrounds said copper casing and core. The winding 17 is connected to a source of alternating current 9 and the meter 18 is connected in series with the winding 17. The mercury 14, as it rises, forms a greater connection between the two halves of the copper shell 15 causing a short circuiting winding to be thrown about the core 16 to a greater or less extent.

Thus, as the pressure due to flow causes changes in the level of the mercury, this change in level will affect the variation in the self-inductive effect or counter-electromotive force in the winding 17 and will thus indicate upon the meter 18 in accordance with the flow in the pipe 1.

I have found that the mercury 14 alone is not sufficiently conductive to secure the proper short circuiting effect unless a large quantity is used. This involves apparatus of such size that the limits of design are soon reached.

Mercury has about 60 times the resistance of copper and for that reason it is at times desirable to increase its conductivity. To this end I have provided the copper sheath 19 about the core 16 for increasing the conductivity of the mercury. This sheath 19 is an open cylindrical ring about the core 16, and the mercury bridges the slight gap in the ring, thereby greatly decreasing the effective resistance of the mercury as it fills only a short gap between the edges of the open slit in the ring.

The slit in the copper ring or sheath 19 may be of any desired configuration, and may be of such a configuration as to correct for variations so that a more desirable scale reading will be produced.

The container 20 in the tube 2 merely forms a reservoir for mercury so that the necessary supply of mercury may be maintained. This container 20 in tube 2 may be of such dimensions that a difference of mercury level in tubes 2 and 3 such as produced by a flow of fluid in the conduit 1 produces a larger or smaller variation in the level of mercury 14 than would normally be the case if all spaces containing mercury were of equal cross-section. Similar results can be obtained by having auxiliary vessels or tubes so arranged as to form parallel reservoirs or tubes with the tubes 2 or 3 by having the same connected by open passageways with the top and bottom of the tubes 2 and 3. This latter method of adjusting the working level of the mercury 14 is particularly applicable to such structures as shown in Fig. 6. In the forms which I have developed pure mercury need not be employed.

One difficulty with the apparatus shown in Fig. 2 is the difficulty of getting a zero reading. When the flow of fluid in the pipe or conduit 1 ceases, the flow of current through the winding 17 does not cease; consequently, the meter is inaccurate for readings approaching zero. A further difficulty with this form of device is the necessary size of the parts, and particularly the coil 17, which must surround the copper shell 15.

In the further developed form shown in Fig. 3, I employ a closed container 22 of non-magnetic material, this container comprising two vertical compartments connected at their tops and bottoms and adapted to be subjected to the pressure from the Pitot tubes 2—3. The chambers 23—24 contain the magnetic cores 25—26 and these cores are surrounded by slotted copper rings 27—28, which slots are adapted to be closed by the mercury in the chambers 23—24.

The two magnetic core members 30—31 have their ends arranged in line with the magnetic core members 25—26 and in line with each other, so that the four cores together substantially complete a magnetic circuit. The shape and form of this magnetic circuit may, of course, be varied.

The primary winding 32 is connected to a suitable source of alternating current and is mounted upon the core 30. A secondary, or metering coil or winding 33 is connected upon the other core 31 and the terminals of this winding are connected to an indicator 34.

In this structure variations in height of the mercury column vary the choking effect upon the magnetic core and choke to a greater or less extent the magnetic flux out of the part of the core which includes the secondary or meter winding 33. In order to do this, it is necessary to secure a very strong choking effect and large short circuiting effect about the cores 25—26.

Before the copper rings 27—28 were put in place, I observed a peculiar effect of the alternating flux upon the ring of mercury. The ring of mercury, forming a short circuit winding about the core, has large current flowing in it and as a consequence it develops magnetic reaction of its own, which tends to "pinch" the mercury ring together and distorting it by an influence entirely foreign to flow in the pipe 1. The introduction of the copper rings 27—28 has considerably decreased this "pinch" effect but the tendency is present. This decrease is secured by subdividing the volume. The reduction in "pinch" may be decreased otherwise.

Figs. 4 and 5 are plan views of the copper rings which may be employed. As shown in Fig. 4 the ends 35—36 of the ring 27 lie adjacent each other, edge to edge with a small slot between them. This slot is adapted to be connected by mercury as the same rises.

In Fig. 5 I have shown the ends 38—39 overlapping with a narrow gap between them providing a large area of contact as the mercury rises between the ends. In this manner, the resistance of the mercury is very much cut down and a more sensitive instrument obtained.

The device shown in Fig. 3 is very economical of mercury and is fairly accurate. The flux which is choked at the cores 25—26 must necessarily lead back through the air and as this path offers large reluctance, more power is expended than is required and it is difficult to choke out all of the flux through the core 33.

In the preferred form shown in Figs. 6 to 8, the magnetic core 41 comprises the limbs 42—43—44 connected together at their ends. The central core 43 may be considered as the main core and the cores 42—44 as branch paths for the flux to be returned to the main core 43. The core 43 is provided with a primary winding 45 which is connected to a suitable source of alternating current 46, as indicated in Fig. 8. The limb 44 has a winding 47 which is connected in series with the indicator 48, or other apparatus. This may comprise an integrating meter, graphic meter alarm, or any type or combination of electric responsive devices. The limb 42 is unwound in this case and at zero reading forms the sole return path for the magnetic flux flowing through the core 43.

As will be explained in detail later, in operation the flux is gradually diverted out of the core 42 and forced into the core 44 so that the two windings 45—47 are thereby put in closer mutual inductive relation and the inductive effect of the coil 45 upon the coil 47 corresponds to the flow of fluid in the pipe 1.

The magnetic members between the cores 43—42 are surrounded by a heavy copper band 49 and the magnetic member between the core 43 and the core 44 are surrounded by the heavy copper band 50. These copper bands 49—50 are made in two parts and are adapted to be adjustable, being held in secure electrical contact by means of the screws 51.

The copper band 50 has its two sides 52—53 brought close together and clamped in parallel position with the insulating filler or plate 54 between them. This insulating filler is shown in elevation in Fig. 11. It has a groove 55 which communicates with the connecting pipe 56. The pipe 56 forms the bottom of a generally U-shaped conduit as will be described later. The insulating filler 54 is clamped with the screws 57. A gasket of transformer linen or similar material may be clamped between the bars 52—53 and the insulating filler. The insulating filling block 54 has an opening 58 therethrough at the upper end of the same, this opening communicating with the groove 55 at the lower end and communicating with the pipe 2 at its upper end. Normally, when the apparatus is in the zero position the mercury rises in the groove 55 just high enough to enter the opening 58 and to connect the bars 52 and 53 together. The copper band 50 is thus divided in two short circuit windings, one about the upper member 60 of the core and the other about the lower member 61 of the magnetic core.

At the point where the groove 55 joins the opening 58, a sharp edge 59 is formed by cutting back the opening 58 as shown at 62. A small leakage hole 63 may be provided for permitting the mercury which may be trapped at the point 62 to drain back to the groove 55. The mercury wets the copper members 52—53, but it does not wet the block and, as a consequence the sharp edge 59 easily breaks the surface tension of the mercury when pressure in the pipe 2 is increased.

Figure 13:
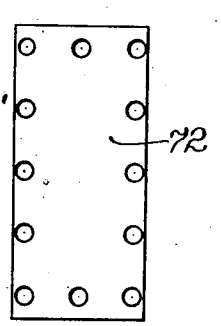
Fig. 13 is an elevation of one of the separating plates for separating the mercury column.

The copper band 49 is constructed in a manner generally similar to the band 50. The two sides 67—68 of the band 49 are arranged parallel to each other and the filler blocks 69—70 are clamped between the sides 67—68 by means of the bolts 71. A copper partition 72 (see Fig. 13) is clamped between the filler blocks 69—70 and another copper partition plate 73, similar to the plate 72, is connected between the block 70 and the side member 67. The filler block 69, the plate 72, and the copper side member 68 form a chamber which communicates at its upper end with the Pitot tube, 3 and at its lower end with the pipe 56, that leads to the chamber formed in the copper band 50 upon the other side of the core 43. The filler block 69 has a groove 82 on one side communicating with the pipe 56 and has an opening 76' at its upper end communicating with the pipe 3. A sharp dividing edge 77 for the mercury is provided as was explained in connection with the filler block 54.

The chambers 58—76', together with the connecting tube 56, form a U-shaped conduit, the upper ends of the U being connected to the pipes 2 and 3, so that as fluid flows in the pipe 1, the level in these chambers will be varied. With an increase in pressure in the pipe 2, the connection between the side members 52—53 will be broken and the connection between the side members 68 and 67 on the copper band 49 will be made, thus permitting flux from the central core 43 to pass through the core 44, and at the same time the flux will be choked out to a greater or less extent from the core 42.

In this way, the inductive influence of the winding 45 upon the winding 47 is increased so that an indication upon the indicator 48 is given of that increase. The copper band 49 is provided with further controlling means governing the choking out of the flux from the core 42 and the forcing of the same into the core 44, these further means being responsive to pressure in the pipe 1 and being further sensitive to the temperature of the instrument to make an automatic self-correction against any variation due to the temperature co-efficients of resistance of the various parts.

The spacing block 70 has a slot 75 therethrough for permitting connection between the copper plates 72—73. A certain amount of mercury is contained in the slot 75 and in the U-tube 76, which connects with the interior of the slot 75. The U-tube 76 connects by means of the tube 77' with the interior of the main pipe or conduit 1. At its upper end, the slot 75 communicates by way of a pipe 78 with a diaphragm chamber 79. The diaphragm chamber 79 contains the diaphragm 80 held by the spring 81, this diaphragm permitting an increase in the capacity of the chamber 79, with increased pressure, so that with the rise in pressure in the pipe 1 the height of the column of mercury in the slot 75 will rise accordingly.

Between the copper plates 73 and the side member 67, an insulating member 83 having a slot therethrough provides a chamber 84 for automatically correcting for the temperature of the relay itself or any connected parts. The short circuit current flowing in the copper bands 49—50 generates heat and as copper has a considerable temperature co-efficient of resistance, it is necessary to correct for the same and I do this in the chamber 84 which is partly filled with mercury. At its lower end, the chamber 84 communicates with a short tube 85 having the adjusting screw 86. The tube 85 forms in effect the bulb of a thermometer, the chamber 84 forming the column of the same. As the mercury becomes heated, due to the temperature rise in the relay or surrounding parts, the mercury rises and offers a greater degree of conductivity between the side 67 and the metallic plate 73, thus correcting for increased resistance due to temperature of the band 50 and connected parts.

It will be seen that any other correction can be made by providing other chambers.

A correction for the varying temperature of the steam may be made as shown in Fig. 8, by placing a resistance 87 of high temperature co-efficient in the conduit or pipe 1. This resistance is then preferably put in shunt to the meter 48 and normally diverts a certain amount of current from the same. As the resistance 87 is heated and its resistance changed thereby, the shunting effect will be changed and the reading upon the meter 48 will be correspondingly changed.

An adjustable or calibrating resistance 88 may be provided in series with the meter 48.

The operation of the device shown in Figs. 6, 7 and 8 is as follows:

When the device is at rest and no steam is flowing in the conduit 1, mercury in the chamber 58 stands just above the edge 59, thereby closing together the two loops of the band 50. At the same time, in the chamber 76' the mercury stands just below the edge 77 leaving the band 50 in non-effective condition about the cores 65—66. Even if there is pressure in the conduit, this has no influence upon the level of the mercury and the meter 48 will read at zero. As soon as flow begins the mercury is driven down below the edge 59 in the chamber 58 and is drawn above the edge 77 in the chamber 76.

As a consequence, the flux created by the coil 45 is admitted to a greater extent to the core 44 and is choked out to a greater extent from the core 42. The effect of closing the gap between the sides of the band 49 or 50 is to put a closed conductor of variable resistance around the magnetic core. As the mercury rises in the chamber 76, the flux from the member 42 will be gradually shifted over into the member 44, giving a greater reading on the indicator 48. For an increase in pressure, the mercury rises in the chamber 75 giving a greater short circuiting effect to the copper band 50 and causing a greater transferrence of flux to the core 44, thereby increasing the reading on the indicator 48.

The temperature correction is apparent. As the instrument becomes warmer the mercury in the bulb 85 and in the chamber 84 will expand increasing the conductivity between the side member 67 and the partition 73. All of these chambers are electrically in series and if any further factor is to be taken into account, it may be made to act upon the mercury in such a chamber.

In order to equalize the temperature of the device, I prefer to put the relay in a bath of oil 89, as shown in Fig. 6, the oil being held in a suitable container 90, similar to a transformer case.

I consider that the relay of my invention—while it is applicable to such cases as measuring flow, variation in temperature and the like—is not limited to such purposes and I find that it is adapted to a great variety of service. It may be used as a sign-flasher, for operating a two-light stereopticon, as a regulator, and for many other purposes.

In Fig. 9 I have illustrated the device of my invention employed as a regulator for regulating the voltage upon the alternating current line 91. The coil 92 upon the central core 93 is connected across the mains 91 and the coils 94 and 95, which are wound upon the legs 96—97, respectively, are connected in series with each other and in series with the mains 91. The copper rings or bands 98—99 are arranged with mercury columns adapted to rise or fall to force the flux from one core to the other, or vice versa. The mercury columns are connected by pipes 100—101 to the piston or diaphragm chambers 102—103, respectively; a voltage coil 104 operates upon a core 105 in accordance with the voltage on the line 91. Movement of the core 105 causes corresponding rise and fall in the connected mercury column, thereby causing a corresponding shifting of the flux in the cores 96—97. The two coils which are in series, namely, the coils 94—95, are placed in opposition so that when the effect of one is decreased, the effect of the other will be increased in the opposite direction. That is to say, one coil boosts while the other bucks.

An arrangement may be provided where the effect of the coils is balanced at zero and one coil is controlled singly. The voltage upon the line 91 is either "boosted" or "bucked" in order to keep the voltage upon the line as desired. The proper initial adjustment may be secured by means of the spring control finger 106, which is governed by the adjusting screw 108 which operates through the spring 107.

The copper bands 98—99 are preferably of the height illustrated in Figs. 6—7.

Figure 10:
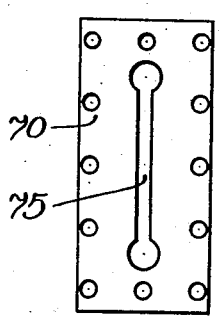
Figs. 10, 11 and 12 are elevations of the insulating container for holding the mercury column.
Figure 11:
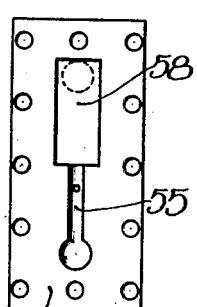
Figure 12:
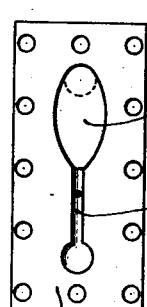

Referring to the filler plates shown in Figs. 10, 11, and 12, it is to be noted that these plates may be chambered in any desired manner, so as to secure the required degree of conductivity between the adjacent conductors to give any desired characteristic.

As shown in Fig. 12, the chamber 76 is formed of a lozenge shape, this being done to secure the desired effect upon the scale divisions of the indicator 48. By controlling the thickness of the fillers and the shape of the chamber in them, any desired effect may be produced.

An adjusting screw 110, shown in Figs. 6—7, provided for adjusting the height of the mercury in the control members.

In Fig. 14 I have illustrated the device of my invention employed in a system for measuring power, taking into account the factors of pressure, temperature and flow of the fluid.

I have shown a steam engine 115 having the usual cylinder 116 provided with a suitable piston connected by a piston rod to a sliding block or cross head, the cross head having operable connection with an eccentric provided on the crank shaft of the engine.

I have placed thermally responsive resistances 118 and 119 of high temperature co-efficient in the inlet and exhaust pipes 120 and 121 respectively of the engine 115 to measure the loss of heat between the point of entry and the point of exhaust, although this loss of heat may be measured in any other suitable manner. The resistances 118 and 119 are connected into the arms 122 and 123 of a Wheatstone bridge. The other arms of the bridge are composed of equal resistances 124 and 125 which may be adjustable. I have shown a radiator 126 connected into the exhaust pipe line 121.

In this form the magnetic core comprises the limbs 127, 128 and 129 connected together at their ends. The central core 128 may be considered as the main core and the cores 127 and 129 as branch paths for the flux to be returned to the main core 128. The core 128 is provided with a primary winding 132 which is connected to a suitable source of alternating current 130. The limb 129 has a winding 133 which is connected in series with the Wheatstone bridge.

As the flow in the inlet pipe 120 increases the flux is gradually diverted out of the core 127 and forced into the core 129, and consequently as has been explained the inductive effect of the coil 132 upon the coil 133 and thereby the voltage across the Wheatstone bridge corresponds to the flow of steam in the pipe 120.

The work expended is read directly from the meter 131 which is placed between the two branches of the bridge. Assuming that steam is delivered through the pipe 120 to the engine 115 where heat is abstracted therefrom and the steam is then exhausted through the pipe 121 it is apparent that an unbalanced condition will be set up in the bridge due to the differences in temperature in the pipes 120 and 121, this difference in temperature accounting for the number of B. T. U. abstracted by the engine. The reading of the meter 131 that is the unbalanced condition in the bridge created by the differences in temperature in the pipes 120 and 121 will be increased or decreased as the voltage in the bridge is increased or decreased.

Now as the voltage across the bridge corresponds to the flow of steam in the pipe 120 as has been explained and as the unbalanced condition of the bridge corresponds to the differences in temperature in the pipes 120 and 121 it is apparent that the work expended may be read directly from the meter 131.

I consider that my invention provides controlling device which is broadly new and I contemplate modification and different applications within the scope of the claims.

I claim:

1. In combination, a winding adapted to be connected to a source of periodically varying current, a relatively movable conducting fluid for varying the inductive effect of said winding, and an electrical indicator governed by the variations in inductive effect of said winding.

2. In combination, a liquid column movable in accordance with a pre-determined effect to be measured, a relatively fixed magnetic core, an inductive winding relatively stationary with respect to said core, said winding being adapted to be connected to a source of periodically varying current, means controlled by the variation of said liquid column for varying the effective flux through said core, and an indicator governed by said variation of flux.

3. In combination, a magnetic core, an inductive winding about said core, a conductor of low resistance about said core and a column of liquid adapted to be varied in height to vary the short circuiting effect of said conductor on said core.

4. In combination, a closed chamber, a magnetic core, a conductor of low resistance communicating with said chamber, said conductor embracing said core and a column of conducting fluid in the chamber adapted to connect adjacent parts of said conductor to secure a greater or less resistance in series with said conductor.

5. In combination, a relatively movable liquid column, a relatively stationary winding adapted to be connected to a source of periodically varying current, an indicator controlled by the variation of magnetic flux, and means controlled by said liquid column for varying the magnetic flux through said winding.

6. In combination, a relatively movable column of liquid, means governing the height of said column, a relatively stationary winding adapted to be connected to a source of periodically varying current, means governed by the periodically varying flux generated by said winding, a relatively stationary magnetic core for the winding and means controlled by said liquid column for varying the effective permeability of said core.

7. In combination, a magnetic core, a conductor of low resistance about said core, said conductor having adjacent portions, a column of conducting liquid for connecting said adjacent portions with greater or less conductivity, means responsive to the flux controlled by the flux in said core, means tending to produce a flux in the core and means controlling the degree of conductivity between the portions of said conductor by said liquid column.

8. In combination, a magnetic circuit, a primary winding on one part of said circuit, said winding being adapted to be connected to a source of alternating current, a secondary winding on another part of said magnetic circuit, an indicator connected to said secondary winding, a movable column of conducting fluid, said column of fluid controlling the flux in that part of the magnetic circuit which controls the secondary winding.

9. In combination, a primary winding, a magnetic member controlled by said winding, a secondary winding controlled by said magnetic member, said primary winding being adapted to be connected to a source of alternating current, a liquid column controlling the effect of the magnetic member upon the secondary winding.

10. In combination, a magnetic member, a primary winding adapted to be connected to a source of alternating current for inducing a constant flux in said magnetic member, a secondary winding controlled by the flux in said magnetic member, a conductor about said magnetic member, and a column of fluid controlling the flow of current in said conductor to govern the flux passing through said magnetic member.

11. In combination, a primary conductor, a source of alternating current for said conductor, a secondary conductor in inductive relation to the primary conductor, an indicator for the secondary conductor, and a movable electrical conducting member responsive to a physical manifestation to be measured or indicated, adapted to vary the inductive action between said conductors, said movable conducting member being adapted to be moved in accordance with the quantity to be measured, or indicated.

12. In combination, a primary conductor, a secondary conductor in inductive relation to said primary conductor, a magnetic core common to said conductors and a movable conducting member about said core, said conducting member being adapted to be moved to have a greater or less flow of current therethrough to govern the distribution of magnetic flux in said core.

13. In combination, a primary conductor, adapted to be connected to a source of alternating current, a secondary conductor in inductive relation to said primary conductor, a magnetic core common to said conductors, a normally opening conducting member about said core adapted to govern the distribution of magnetic flux in said core, and a movable column of fluid adapted to close said conducting member to a greater or less degree, said conductor being subject to the alternating flux to cause a current to flow therein.

14. In combination, a magnetic circuit adapted to convey a magnetic flux, a winding linking with a portion of the flux of said magnetic circuit and mechanically controlled means comprising a liquid column for regulating the amount of flux linkage between said magnetic circuit and said winding.

15. In combination, a primary winding, a source of periodically varying current for said winding, a conducting fluid for controlling the magnetic effect of the winding, and an electrical responsive device governed by the magnetic effect of said winding.

16. In combination, a liquid column movable in accordance with a pre-determined physical variation, a magnetic core, an inductive winding for said core, said winding being adapted to be connected to a source of fluctuating current, means controlled by the variations of said liquid column for varying the effective flux through said core, and electroresponsive means governed by said variations of flux.

17. In combination, a primary winding, a secondary winding, a magnetic core magnetically connecting said windings and a liquid column of variable height for controlling the magnetic flux through said core linking with the secondary winding.

18. In combination, a magnetic core, a primary winding on the core, a secondary winding on the core, an intermediate winding of low resistance, a liquid column of variable height for forming a connection of variable resistance across the terminals of the intermediate winding.

19. The method of securing an electrical responsive action corresponding to physical movement of an object which comprises creating an alternating flux of magnetism in a given path, causing the flux in said path to act upon a conductor to create a potential and interposing in accordance with the physical movement, a conductor in the form of a conducting fluid in said path to vary the influence of the magnetic flux upon the conductor.

20. In combination, a magnetic member comprising a main core, and two secondary cores in parallel with the main core, a winding on the main core, a winding on one of said secondary cores, a choking means governing the flux passing through said secondary cores and means for decreasing the effective permeability of one of said secondary cores and increasing the effective permeability of the other of said secondary cores.

21. In combination, a main core, a pair of secondary cores, connected magnetically in parallel with the main core, a winding on one of said secondary cores, an electroresponsive device connected to said winding, and movable electrical means independent of said windings, governing the distribution of flux in said secondary cores, said means being movable to shift the magnetic flux from one core to the other of the secondary cores, or vice versa.

22. In combination, a closed magnetic circuit, a primary winding upon one limb of the magnetic circuit, a secondary winding on the other limb of the magnetic circuit, a conductor of low resistance about one part of said magnetic core, said conductor having a gap between its ends, a movable column of conducting fluid, said column being adapted to connect the ends of said conductors together, to a greater or less degree.

23. In combination, a closed magnetic circuit, a primary winding on one limb of the circuit, a secondary winding on another limb of the circuit, an electroresponsive element connected to said secondary winding, an electrical conductor of low resistance about one part of said magnetic circuit, said conductor having its ends separated by a gap and movable means comprising a column of conducting fluid for bridging said gap to a greater or less degree.

24. In combination, a closed magnetic circuit, means for creating a flux in said magnetic circuit, means responsive to flux in one part of the circuit, a choking conductor about said circuit for varying the effect of the flux upon said one part of the magnetic circuit, and means for controlling the conductivity of said choking conductor.

25. In combination, a magnetic core, means for creating a magnetic flux in a part of said core, means affected by the magnetic flux in another part of the core, a conducting band surrounding a part of the core between said parts and pressure-sensitive means for varying the resistance of said conducting band to control the flux through a part of said core.

26. In combination, a magnetic circuit, a conductor of low resistance partially linking with said magnetic conductor, said electrical conductor having a series of gaps therein, a fluid column means controlled by said fluid column for bridging one of the gaps, and independent means for bridging another of said gaps.

27. In combination, a magnetic circuit, means for creating a flux in said circuit, means governing the distribution of flux in said magnetic circuit, said means comprising a conductor of relatively low resistance, partially linking with said magnetic circuit, said electrical conductor having a plurality of gaps therein, a fluid column for bridging one of said gaps to a variable degree, and independent means for bridging another of said gaps to a varying degree.

28. In combination, a magnetic core in the form of a closed circuit, a conducting band or loop encircling the entire magnetic circuit, and a fluid column adapted to connect opposite sides of the conductor to a varying degree to form separate electrical loops about the magnetic core.

29. In combination, a magnetic ring, a conducting loop inclosing the ring, the sides of said loop being brought adjacent each other between opposite parts of the magnetic ring, a conducting member lying between the sides of said conducting loop and fluid columns for connecting the sides of the band to said conducting member.

30. In combination, a closed magnetic circuit, a conducting loop or band inclosing said magnetic circuit, a non-conducting member having a chamber therein, adapted to be clamped between the sides of the loop between opposite parts of the magnetic member, and a column of conducting fluid for said chamber for connecting the sides of the loop together to a greater or less extent.

31. In combination, a closed magnetic circuit, a conductor inclosing said magnetic circuit, a non-conducting member having a chamber therein, adapted to be clamped between the sides of the conductor between opposite parts of the magnetic member, a column of conducting fluid for said chamber for connecting the sides of the conductor together to a greater or less extent, and temperature controlled means for controlling the effect of variations of temperature upon said conductor.

32. In combination, a magnetic circuit, a choking conductor adapted to partially link a part of said magnetic circuit, a liquid column for connecting together portions of the choking conductor to complete the linkage, and thermally responsive means for correcting for changes of resistance in said choking conductor.

33. In combination, a main magnetic core, a pair of secondary cores connected in parallel to the main core, choking conductors looped about the magnetic members between the main core and the secondary cores, and a pair of liquid columns between the sides of said loops for connecting said loops to a greater or less extent, to govern the distribution of flux in the secondary magnetic cores.

34. A magnetic main circuit excited from a source of periodic varying current, a magnetic circuit arranged in shunt to said magnetic main circuit and means for controlling the distribution of effective magnetic flux between said magnetic circuits.

35. A magnetic main circuit excited from a source of periodically varying current, a second magnetic circuit arranged in shunt of said magnetic main circuit and short circuiting bands for controlling the distribution of effective magnetic flux between said magnetic circuits.

36. In combination, a magnetic core adapted to be energized by an alternating flux, a winding in inductive relation to said core, a column of fluid adapted to complete a short circuiting band about said core, said column being subject to variations which vary the degree of short circuit about said core.

37. In combination, a relatively fixed magnetic core, a relatively fixed winding in inductive relation to said core, means to magnetize said core with an alternating magnetic flux, and a relatively movable column of fluid in suitable relation to said core to control the effective magnetic interaction between said core and said winding.

38. In combination, a primary electric circuit adapted to be energized by a periodically varying electric current, a magnetic circuit linked with and adapted to be energized by said primary electric circuit, and a liquid column adapted to be varied, said column controlling the effective permeability of said magnetic circuit.

39. In combination, a substantially constant source of fluctuating current, a conductor energized thereby to set up a corresponding magnetic flux, a secondary conductor subject to said magnetic flux, a body of fluid adapted to be varied in accordance with the variations of a controlling physical manifestation, the variations of said fluid imposing corresponding variations in the effect of said magnetic flux upon the secondary conductor, and an electro-responsive element connected to said secondary conductor, said element being thereby made responsive to the variations of said physical manifestation.

40. In combination, a winding adapted to be energized by a periodically varying current, a secondary winding in inductive relation to said first winding, and a conducting fluid for varying the inductive effect of said first winding upon the secondary winding.

41. In combination, a primary conductor adapted to be energized by periodically varying current, a secondary conductor in inductive relation to said primary conductor, and a liquid column adapted to control the inductive effect of the primary conductor upon the secondary conductor, said secondary conductor being adapted to be connected to an indicating device, and said liquid column being adapted to be varied by the physical manifestation which is to be indicated.

42. A relay system comprising a liquid column adapted to be varied by a controlling physical manifestation, a primary conductor normally energized to set up a periodically varying magnetic flux, and a secondary conductor in the range of action of said magnetic flux, said liquid column being conductive and being disposed in suitable relation to the magnetic flux to control the interaction of the flux and the secondary conductor.

43. In a system of the class described, a liquid column adapted to be moved in accordance with the variations of a physical manifestation, an electrical indicator having substantially equal scale divisions, and an electro-magnetic transformer having a primary winding normally excited by constant voltage alternating current and a secondary winding connected to said indicator, said column varying the magnetic relation of the transformer windings to cause the indicator to move substantially in direct accordance with the movement of the column of liquid.

44. In combination, a liquid column adapted to be moved in direct accordance with the variations of a physical manifestation, an electrical indicator having equal scale divisions and a circuit having an inherent straight line law of relation to the movement of the liquid column connected to said indicator.

In witness whereof I hereunto subscribe my name this 15th day of December, A. D. 1917.

ALFRED HERZ.